UNITED STATES PATENT OFFICE.

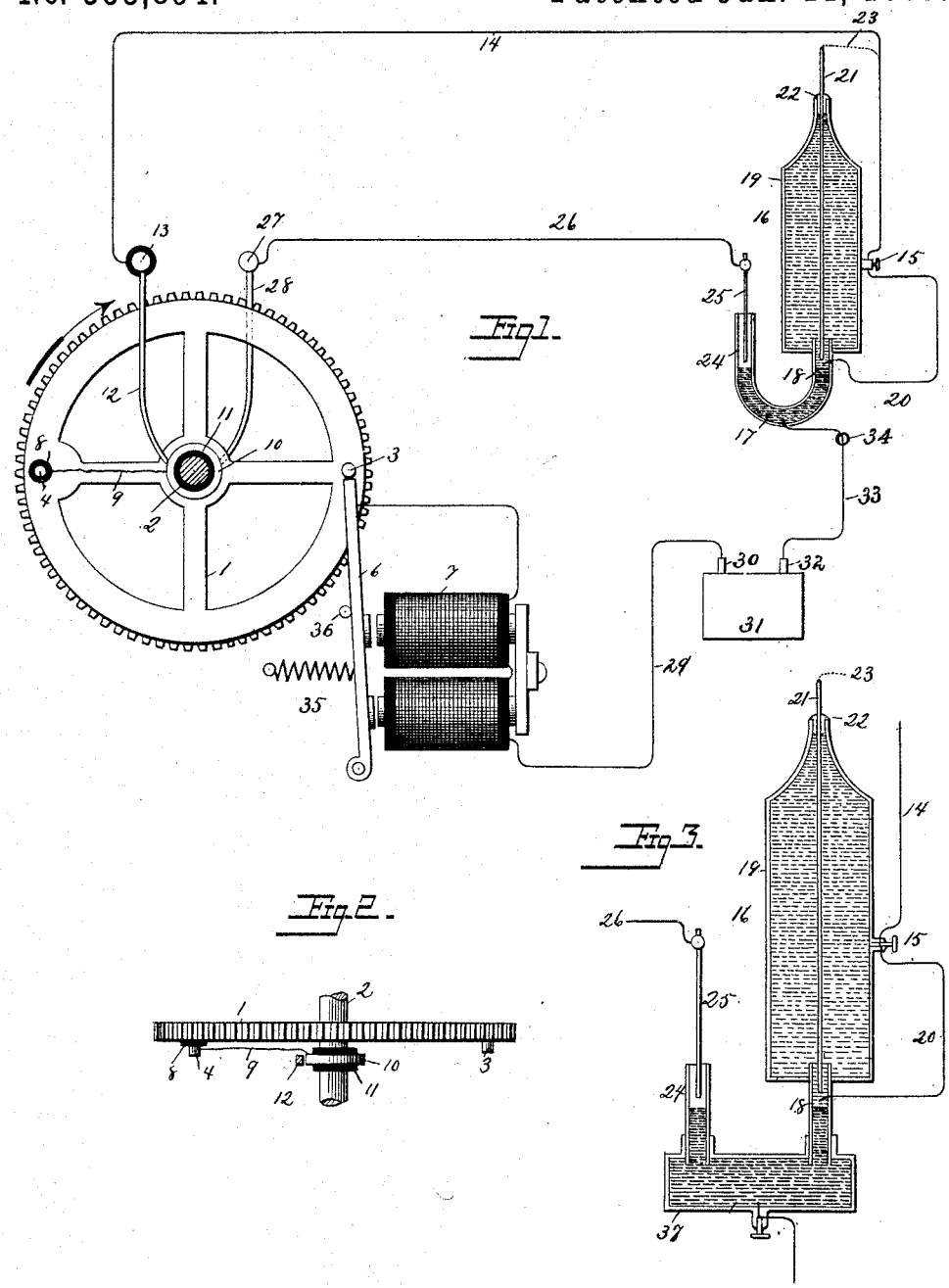

GEORGE M. STERNBERG, OF THE UNITED STATES ARMY.

ELECTRO-MAGNETIC REGULATOR FOR DAMPERS AND VALVES.

SPECIFICATION forming part of Letters Patent No. 355,894, dated January 11, 1887.

Application filed September 1, 1886. Serial No. 212,398. (No model.)

*To all whom it may concern:*

Be it known that I, GEORGE M. STERNBERG, of the United States Army, a citizen of the United States, temporarily residing at Baltimore, Maryland, have invented certain new and useful Improvements in Electro-Magnetic Regulators for Dampers and Valves, of which the following is a specification.

My invention relates to improvements in automatic valve or damper regulators of that particular class wherein the closing of an electric circuit operates to set mechanism in motion to open or close a valve or damper for or against the passage of a fluid therethrough; and to this end it consists in a peculiarly-constructed thermostat adapted to close an electric circuit when the temperature of the surrounding atmosphere rises above or falls below certain predetermined limits; in electric connections which extend between such thermostat and the valve-controlling magnet, and connected means whereby the closing of the electric circuit at the thermostat operates to break such circuit at the valve-controlling magnet and release the valve-operating mechanism, all substantially as hereinafter set forth, and illustrated in the accompanying drawings, in which similar figures of reference denote similar parts.

In said drawings, Figure 1 represents a diagrammatical view illustrating so much of a valve or damper controlling mechanism as is necessary to illustrate my invention. Fig. 2 represents an edge view of the valve or damper mechanism controlling-wheel and its attached circuit-controlling devices, and Fig. 3 represents a modified form of the thermostat employed in my invention.

In the present embodiment of my invention I have illustrated and shall hereinafter confine my description solely to the mechanism for controlling the movements—that is to say, the starting or stopping of a valve or damper operating mechanism, without regard to the construction or arrangement of said operating mechanism or the means for imparting motion thereto, or without regard to the particular form or description of valve or damper operated by such mechanism, as it will be understood that my invention may be used in connection with any and all forms of valves or dampers and valve or damper operating mechanism, whether driven by clockwork or other power.

For the purpose of automatically controlling a valve or damper actuating mechanism, I provide a wheel, 1, which is connected with the mechanism whereby the valve is operated, and which is mounted upon a shaft, 2, and is provided with projecting studs or pins 3 and 4, which are successively engaged by the free end 5 of a pivoted arm, 6, carrying an armature which operates in the magnetic field of an electro-magnet, 7, which is interposed in and forms a part of the working-circuit, as will be hereinafter set forth.

One of the studs or pins 4 is insulated, as shown at 8, from the wheel 1, and is connected by a conductor, 9, with a metallic ring, 10, which is mounted upon the shaft 2, and properly insulated therefrom by a ring, 11, of insulating material, as shown. A contact spring or brush, 12, which extends from a post, 13, properly insulated from its support, bears against the ring 10 to establish circuit through said ring 10 to the stud or pin 4, as will be hereinafter set forth.

I connect the post 13 by a conductor, 14, with a binding-post, 15, which is secured to a thermostat, 16, adapted to be located in the apartment wherein it is desired to maintain a predetermined degree of temperature.

The thermostat 16 may be constructed in the form shown in Fig. 1—that is to say, consisting of a U-shaped tube, 17, of non-conducting material, containing mercury, to one arm, 18, of which tube a vessel, 19, which contains a gas or fluid expansible by heat—as, for example, air, alcohol, turpentine, benzole, &c.—is attached and in communication. A conductor, 20, extends from the post 15 to and enters and is sealed in the arm 18 of the tube 17 at a point which coincides with the degree below which it is desired that the temperature of the room shall not fall.

When desired, the conductor 20 may be released from the post 15, and the conductor 14 may be connected directly to a rod, 21, which adjustably extends through the vessel 19 and a plug or cap, 22, which closes the mouth of said vessel, as shown by dotted lines 23.

I provide the remaining arm, 24, of the U 17 with an adjustable rod, 25, which is connected by a conductor, 26, with a binding-post, 27, from which a contact spring or brush, 28, extends to and bears upon the shaft 2 or upon some part of the wheel 1.

If desired, the conductor 26 may connect directly with the frame of the valve-actuating mechanism.

From the magnet 7, hereinbefore referred to, a conductor, 29, extends to one pole, 30, of a battery, 31, the remaining pole, 32, of which is connected by a conductor, 33, with a binding-post, 34, in electric contact with the mercury in the U 17.

It will be understood that contact of the mercury in the arm 24 with the rod 25 therein is caused by the expansion of the fluid in the vessel 19, which expansion is due to the rise of temperature in the apartment in which the thermostat is located. It will also be understood that contact of said mercury with the conductor 20 or rod 21 in the arm 18 of said thermostat is caused by the contraction of said fluid; hence it follows that the contact points or terminals of the conductors 20 and 26 may be adjusted very near the surface of the mercury in the respective arms 18 and 24 of the U 17, so that the variation of temperature in the apartment containing the thermostat to the extent of one degree, or even less, will bring one or the other of said terminals into contact with said mercury, and so establish circuit through one or the other of the conductors 14 or 26 and the remaining elements of the device, hereinbefore named.

To illustrate: Suppose the several parts of the device be in the position shown in Fig. 1, the stud or pin 3 resting upon (or otherwise held from movement by) an arm, 6, carrying the armature of the electro-magnet 7, at which time it will be understood that the valve controlled by the wheel 1 is open to the passage of heated air to the apartment, which heated air will cause the fluid in the thermostat to expand and so close the circuit from the battery through said mercury, the conductor 26, brush 28, wheel 1, pin 3, arm 6, electro-magnet 7, and back to battery, thus energizing said magnet and withdrawing the arm 6 from contact with the pin 3, which action not only leaves the wheel 1 free to be rotated by its motor to close the valve, but also breaks the circuit described, whereby the magnet 7 is demagnetized and the arm 6 returned by a spring, 35, to its normal position, determined by a stop, 36, and in the track of the pin 4 of the wheel 1, which pin will by the forward rotation of the wheel now be brought into contact with said arm. As said pin 4 is, as hereinbefore explained, insulated from the wheel, the circuit will remain broken and the valve closed until the contraction of the fluid in the thermostat causes the mercury in the U-tube to make contact with the conductor 20 or rod 21, and thus closes circuit through the conductor 14, brush 12, ring 10 and its connected pin 4, the arm 6, magnet 7, and battery, which closing of circuit operates, as before described, to release pin 4 from engagement with arm 6, demagnetize said magnet, and return said arm into the path of the pin 3, which will in turn be arrested by said arm.

From the foregoing it will be apparent that the circuit, when closed at the thermostat through either the expansion or contraction of the liquid therein, is instantly broken by the withdrawal of the arm 6, through the magnet 7 and its armature, which is attached to said arm, from contact with either of the pins 3 or 4 of the wheel 1. It will also be apparent that the circuit will be closed through the parts described in successive order by the rising or falling of the temperature in the apartment in which the thermostat is placed.

In Fig. 3 I have shown a modified form of thermostat, in which I employ, in lieu of the U-shaped portion 17, a vessel, 37, provided with apertures to receive upwardly-projecting arms formed of suitable non-conducting material, as glass, hard rubber, &c., one of which arms is connected with the vessel 19, and is entered by the terminals of the conductor 20 or rod 21, while the other is entered by the rod 25, as hereinbefore described.

It will be understood that the wheel 1 may be provided with any desired number of movement-arresting pins 3 and 4, it only being necessary that such pins be arranged in alternate order, as herein shown—that is to say, pins or studs in electric contact with the wheel 1 alternating with pins or studs which are insulated from said wheel, said pins or studs each properly connected with a thermostat, in manner hereinbefore set forth. It will be understood that said pins or studs 3 and 4 may be engaged by either the arm 6, which carries the armature in any manner, or by the armature itself, or by a device independent of said arm and armature and operated in any manner thereby.

If desired, the wheel 1 of the valve-actuating mechanism may be provided with gear-teeth, as shown, to engage a similar gear-wheel or a rack-bar, or with ratchet-teeth to engage pawls, or with a plane periphery to receive a belt, or with sprocket-teeth to receive a chain.

If desired, the pins 3 and 4 may be separated from the wheel 1, and may project either from the shaft 2 or from arms attached to said shaft.

Any suitable form of thermostat whereby an electric circuit is closed by the rising or falling of the temperature of the apartment in which it is placed may be used in lieu of the thermostat herein shown and described.

Without limiting myself to the exact construction and arrangement of parts herein shown, I claim—

1. The combination, with the operating mechanism of a valve or damper, of a thermostat, a single magnet, its armature, and electrical connections, including said thermostat and armature, whereby when a circuit is closed at said thermostat said magnet will be energized and simultaneously release the valve-operating mechanism and break the circuit, substantially as described.

2. The combination, with a valve or damper operating mechanism, of a thermostat, a single magnet included in two independent circuits, an arm controlled by said magnet, connected with said valve-operating mechanism and included in each of the independent circuits of said magnet, substantially as described.

3. The combination, with the controlling-wheel of a valve or damper operating mechanism provided with studs, of a thermostat, a magnet the armature lever of which engages said studs, and electrical connections including said wheel, substantially as described.

4. The combination, with the controlling-wheel of a valve-operating mechanism having studs, one or more of which are insulated from said wheel, of a thermostat, a magnet the armature-lever of which engages the studs, and independent circuits from the thermostat, each alternately including the armature-lever, substantially as described.

5. The combination of the controlling-wheel of a valve-operating mechanism, a single magnet, its armature, a thermostat controlling the movement of said mechanism, and electrical connections including said thermostat, controlling-wheel, and armature, whereby a difference in the temperature in either direction will close a circuit through said thermostat, wheel, armature, and magnet to energize said magnet, and thereby to simultaneously release said wheel and break said circuit, substantially as described.

6. The combination, with the controlling-wheel of a valve-operating mechanism having studs which are alternately in contact with and insulated from said wheel, of a thermostat and electrical connections, and means, substantially as described, whereby said studs are successively thrown into circuit with said thermostat, substantially as described.

7. A thermostat consisting of a tube containing mercury, a fluid-holding vessel attached to said tube, and electrical connections adjustably secured to the opposite ends of said tube, and means, substantially as described, to close an electric circuit through one or the other of said connections, and a valve-controlling device, substantially as described.

8. A valve-operating shaft, a wheel thereon, studs projecting from said wheel, one or more of which are insulated from the wheel, an insulated ring upon said shaft, and electrical connections, in combination with a thermostat, a magnet, and connected means, substantially as described, whereby an electric circuit is closed through said studs; as and for the purpose specified.

In testimony whereof I have signed my name to this specification in the presence of two subscribing witnesses.

GEORGE M. STERNBERG.

Witnesses:
F. L. FREEMAN,
WM. A. HARRIES.